Oct. 6, 1936.  P. F. K. ERBGUTH  2,056,177
FLOW METER
Filed Feb. 3, 1933  3 Sheets-Sheet 1
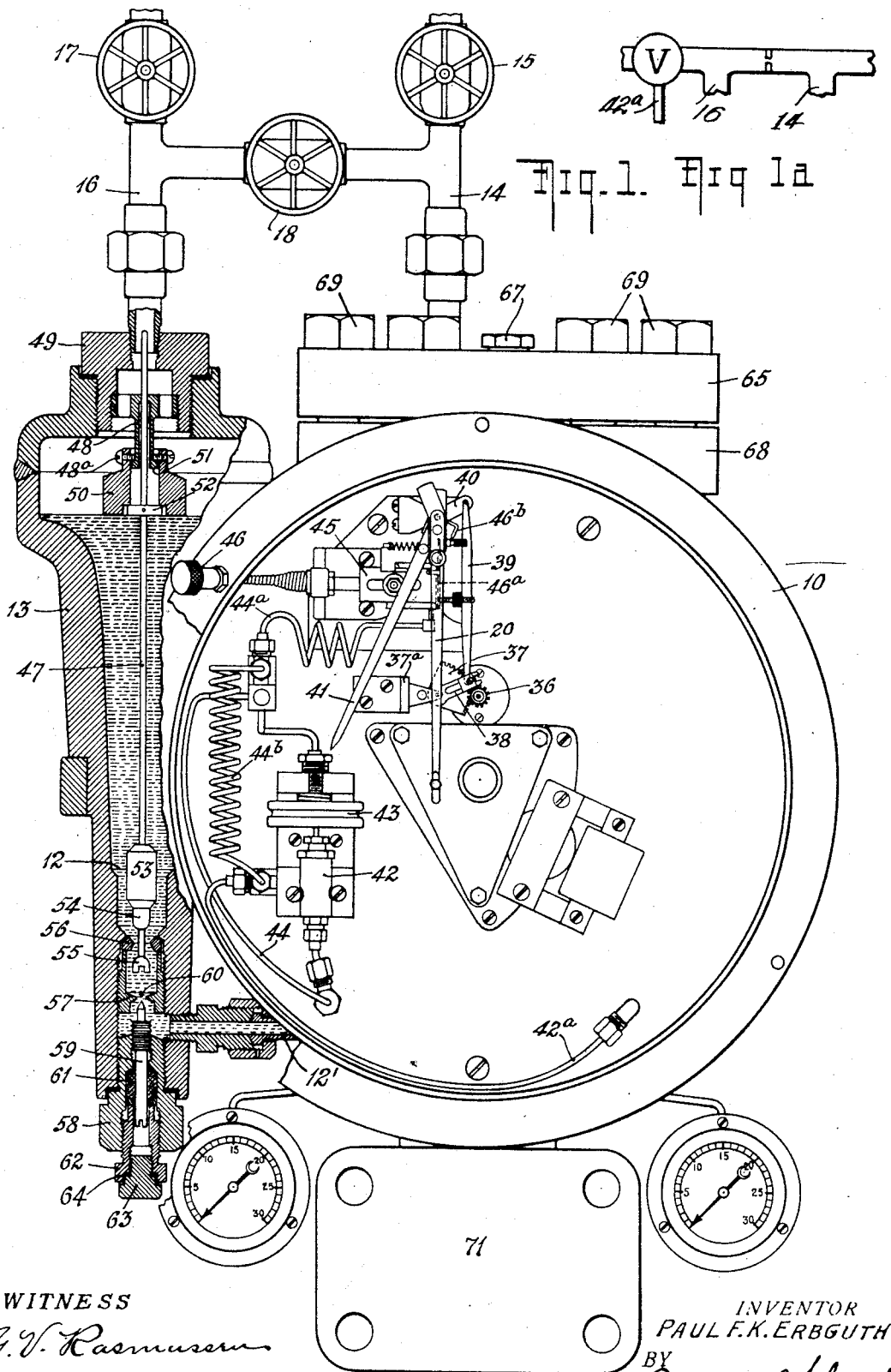
WITNESS
G. V. Rasmussen
INVENTOR
PAUL F. K. ERBGUTH
BY
Miesen Schenck
ATTORNEYS

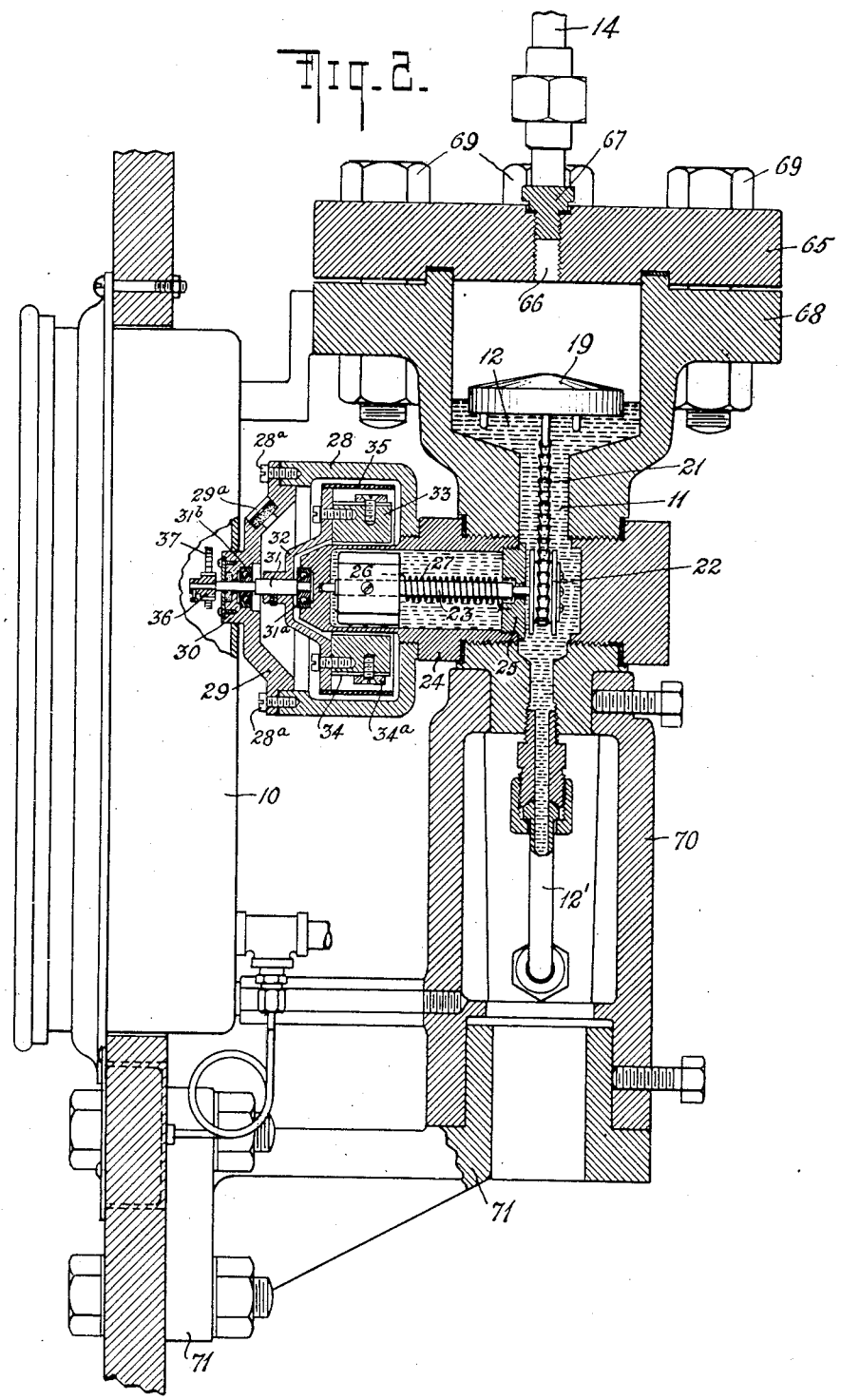

Oct. 6, 1936.  P. F. K. ERBGUTH  2,056,177
FLOW METER
Filed Feb. 3, 1933   3 Sheets-Sheet 3
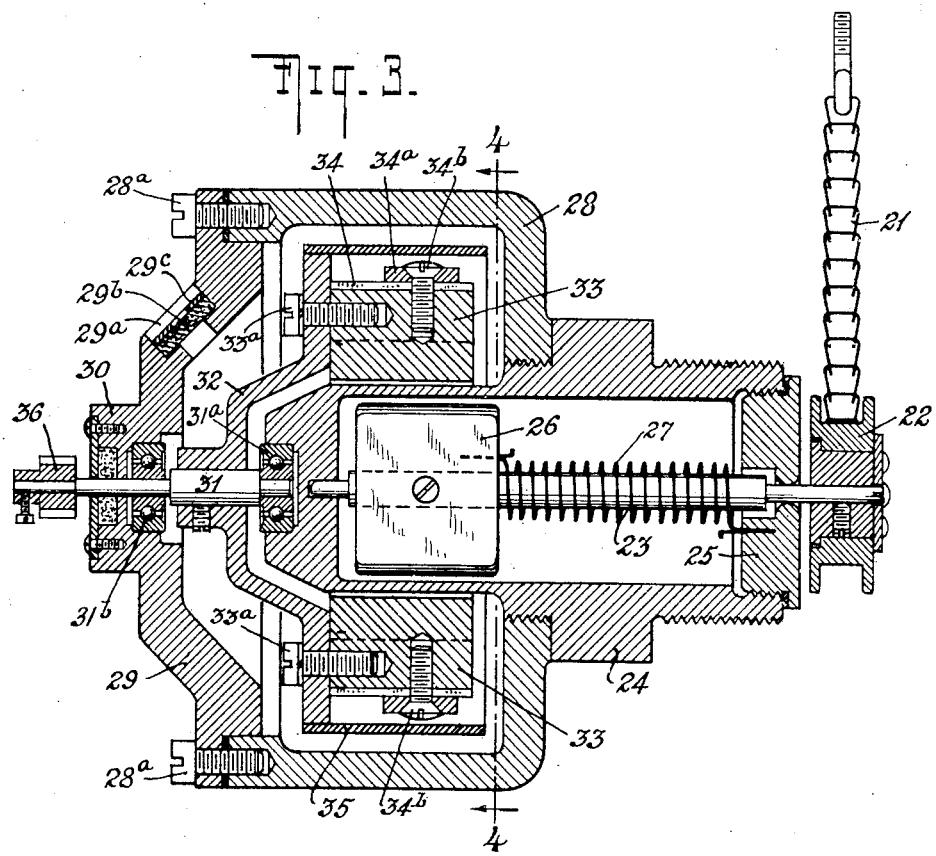
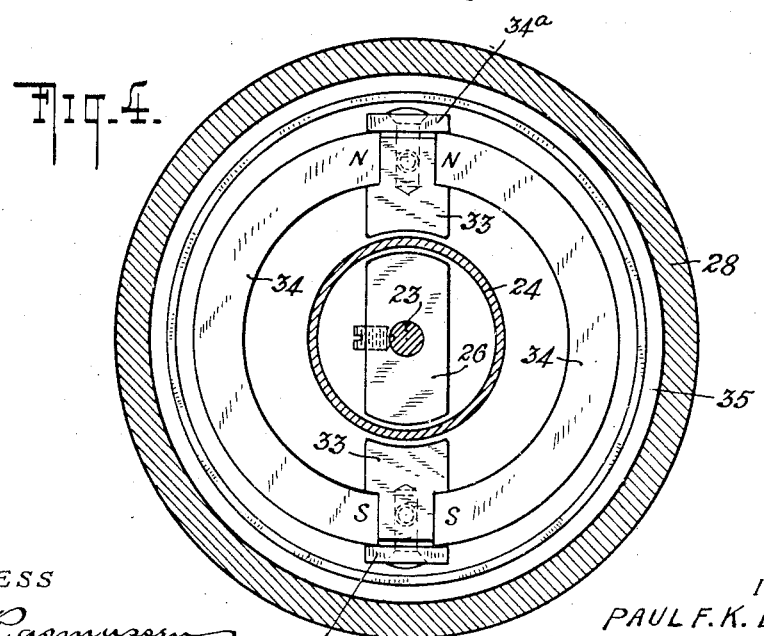
INVENTOR
PAUL F. K. ERBGUTH Patented Oct. 6, 1936

2,056,177

UNITED STATES PATENT OFFICE 2,056,177

FLOW METER

Paul F. K. Erbguth, Brooklyn, N. Y., assignor to Charles J. Tagliabue Mfg. Co., Brooklyn, N. Y., a corporation of New York Application February 3, 1933, Serial No. 654,993

14 Claims. (Cl. 73—205)

The present invention relates to instruments, such as gauges and flow meters, of the U-tube type, wherein the movement of a responsive or adjustable element within a sealed chamber or arm of the U-tube is transmitted to mechanism, such as a registering, indicating, or recording arm, externally of the chamber. The invention relates in particular to instruments characterized by the provision of two arms, wells, or columns in communication at their lower ends, and containing a body of liquid, and subjected to different pressures, as in a U-tube flow meter, fluctuations in the pressure in said arms, wells, or columns, as a result, for example, of changes in the rate of flow of a fluid to be measured, being manifested by fluctuations in the level of the liquid in such columns to a degree dependent on the differential of the pressures acting on such columns.

It is the object of the invention to provide improved mechanism whereby fluctuations in a physical condition within a sealed chamber, as within an arm, well, or column, of a U-tube type of gauge or flow meter, are sensitively and accurately transmitted to mechanism externally of the chamber with a minimum of mechanical resistance, such as friction. It is also an object of the invention to protect the moving parts inside the sealed chamber, arms, wells, or columns, against corrosion and against obstruction by foreign matter. It is a further object of the invention to protect the mechanism within such chamber, arms, or columns, against abnormal conditions in a simple and efficient manner; in the case of a U-tube type of flow meter or gauge, for example, against excessive pressure in one or the other column tending to force all of the liquid into one column and into the connected piping, and against breakage of one of the connecting tubes.

The invention will be described in detail as embodied in a U-tube type of flow meter, but it is to be understood that the invention is not limited to this type of instrument, and it will be evident that various features of the invention, singly and in combination, can be applied to or adapted for use in other types of instruments and apparatus.

According to the invention, the movement of a float within a column of a U-type flow meter is transmitted magnetically to a moving part externally of the column without mechanical connection between the parts within and without the column. In the preferred form of the invention, vertical movements of the float are converted in any suitable manner into rotary motion of a magnetically permeable member acting as a core or armature and located within the column or in a chamber communicating therewith. Strong magnets are arranged about the core or armature externally of the column or chamber and are mounted for rotary motion, so that they will follow the angular movements of the core or armature within the column or chamber. The movements of the magnets are then transmitted to suitable indicating, recording, or control mechanism of an appropriate instrument.

Mechanism of a simple and reliable character is provided for protecting the instrument against abnormal conditions, such as an excessive pressure upon the high or low pressure column of the U-tube tending to produce a differential which is outside the normal range of the instrument and creating the danger of blowing out of the liquid. In the preferred embodiment of the invention, such safety mechanism comprises a float arranged within the body of liquid in the high pressure side or column of the U-tube and provided with valves cooperating with valve seats for closing the communication between the two columns of the tube, either when the liquid in the high pressure side has been exhausted beyond the normal range of operation of the instrument or when an excess of liquid enters the high pressure side from the normally low pressure side. Substantially all of the moving parts of the instrument within the U-tube, and particularly the valves and their seats, are normally permanently submerged in the liquid, such as mercury, and are thereby protected against corrosion and against interference by foreign matter.

The invention will be described in detail in connection with the accompanying drawings, wherein Fig. 1 is a front view of a flow meter embodying the invention, the same showing a section through the high pressure column of the instrument; Fig. 1a is a diagrammatic view of the pipe with the constricted orifice and the control valve; Fig. 2 is a view at right angles to Fig. 1 and shows a section through the low pressure column and associated mechanism; Fig. 3 is an enlarged section through the magnetic motion transmitting mechanism; and Fig. 4 shows a vertical section on the line 4—4 of Fig. 3.

Referring to the drawings, the casing of the instrument is indicated at 10, there being located within the casing a dial or chart (not shown) in any known or suitable manner. Within the casing is housed the registering, recording, or control mechanism, one form of which is described below, such mechanism being actuated in response to fluctuations in the level of a body of liquid 12, such as mercury, contained in a U- or manometer-tube system whose low pressure column or arm is shown at 11 (Fig. 2) and high pressure column or arm at 13 (Fig. 1). As illustrated, the plane of the casing 10 is preferably made substantially parallel to the vertical axes of the columns 11 and 13. The columns 11, 13 are connected at their lower ends by a pipe assembly 12' of relatively narrow gage. The low pressure column 11 may be connected through a pipe 14 and valve 15 with the low pressure side of an orifice plate (not shown), while the high pressure arm 13 is connected through pipe 16 and valve 17 with the high pressure side of the orifice plate arranged in the conduit, the flow through which is to be measured and/or controlled. The two pipes 14 and 16 may be connected through a valve 18 for bringing the meter to zero.

A float 19 is supported upon the body of liquid in the low pressure column 11, and the mechanism about to be described is designed to transmit the vertical movements of the float to the registering or recording arm 20 (Fig. 1) of the flow meter. To this end there is attached to the float a chain or other flexible element 21 whose other end is fastened to a pulley 22 fixed upon a shaft 23. The shaft 23 extends into a lateral chamber 24 and is loosely supported at its right end (Fig. 2) in a removable end wall or cap 25 which separates the interior of chamber 24 from the column 11. The other end of the shaft 23 is journalled in the opposite end wall of the chamber 24. A rotor or core piece 26 of magnetic material, such as soft iron or any suitable alloy, whose function will be explained below, is fixed to the shaft 23, so as to rotate therewith. A spring 27 coiled around the shaft 23 is anchored at one end in the cap 25 and with its other end engages the core piece in such a manner as to urge the shaft and pulley to take up any slack in the chain 21, so that the shaft by its rotation follows all movements of the float 19.

The walls of the chamber 24 are of non-magnetic material and the chamber may be filled, as shown, with the same liquid, such as mercury, as is contained in the column 11. It will be noted that the mercury completely fills the chamber 24, so that the mechanism housed in such chamber is completely submerged. The liquid in chamber 24 can expand through the loose or open bearing of the shaft 23 in the cap 25, but does not ordinarily circulate with the mass of mercury in the column 11; similarly, the pressure in column 11 is transmitted to the chamber 24 through such loose bearing.

It will be noted that the bearings for the shaft 23 are loose and free of any stuffing box arrangements, so that said shaft rotates with a minimum of friction. Moreover, all parts except the top of the float 19 are protected against the corrosive action of the fluid pressing upon the exposed surface of the float and of the mercury, so that such protected parts always remain clean and in proper working condition without the special sealing arrangements that are necessary in certain known types of gauges and meters. The motion transmitting mechanism is entirely enclosed and has no open bearing leading to the outside of the instrument and its operation is not affected by the static pressure under which the instrument is working.

An annular bracket 28 is supported at one end upon the chamber 24, as by screw-threaded engagement with the latter, and is closed by a plate 29 attached thereto by screws 28a. The plate is provided with a boss 30 which is received in a suitable aperture in the rear of the casing 10. A shaft 31 is supported in anti-friction bearings 31a and 31b in the end of the chamber 24 and in the plate 29, respectively, and at its right-hand end (Figs. 2 and 3) has fixed thereto a pair of arms 32 carrying pole pieces 33 arranged diametrically opposite each other and connected to the arms by screws 33a. Strong magnets 34, which may be permanent in character, are clamped against the pole pieces 33 in interlocking relation by plates 34a and screws 34b. The pole pieces are arranged concentrically and in radial alignment with the core 26. Like poles of the two magnets are clamped to the same pole piece, as shown at N, N and S, S, thereby producing a powerful magnetic field running from pole piece to pole piece through the non-magnetic wall of the chamber 24 and through the soft iron core 26. The pole pieces do not touch the walls of chamber 24; and to keep the gap between the pole pieces and the core as small as possible, the chamber 24 is made of a non-magnetic material of high tensile strength, so that the section of the wall of the chamber between the pole pieces and core may be made quite thin, as shown, the material being capable also of resisting the action of mercury or of any other measuring liquid that may be employed. I have found 18—8 (18% chromium, 8% nickel) stainless steel to be very suitable for this purpose.

The magnets 34 and the pole pieces 33, and with them the shaft 31, will follow quickly and accurately the angular movements of the core 26 as the latter is rotated in response to changes in the level of the mercury in the column 11. This follow-up movement is accomplished through the magnetic coupling between the pole pieces and core, and thus without any direct mechanical connection between the shafts 23 and 31. To reduce disturbances upon the magnetic system within the bracket 28, a thin shield 35 of iron may be arranged around the magnets and pole pieces. The plate 29 is provided with a "breather" in the form of an aperture 29a closed by a porous dust guard 29b which is held in place by a perforated, tightly fitting washer 29c. By this means the pressure within the casing 28, 29 is maintained at atmospheric.

The rotary movements of the shaft 31 are transmitted to the mechanism within the casing 10 through a pinion 36 fixed upon an extension of the shaft beyond the boss 30, such pinion meshing, for example, with a segment 37 (Fig. 1) suitably journalled upon a bracket 37a fixed within the casing 10. An arm 38 rigid with the segment and coaxial therewith is connected through a link 39 and arm 40 with the indicating or recording arm 20 of the instrument. The connection between the arm 38 and link may be adjustable to assist in establishing the proper ratio between the movements of the float 19 and the indicating arm 20. To reduce friction, the segment 37 and arm 20 are preferably supported in pivot bearings, while the backlash in the gearing may be overcome by overweighting the link 39, so that it would tend to move the arm 20 clockwise if the pinion 36 were removed.

The instrument illustrated is of the flow controlling type, i. e. is operative to maintain the flow through a conduit at a value predetermined by the setting of a pointer 41, but it will be understood that my invention is not limited to this type of instrument. The control mechanism shown by way of example on the drawings is of the type described in the United States patent to Frank J. Bast No. 1,837,397, dated December 22, 1931, and in the copending application of Frank J. Bast, Serial No. 624,301, and comprises generally a pilot valve 42 which controls the pneumatic pressure upon the diaphragm of a diaphragm control valve V or other servo-motor through the pipe 42a. The pilot valve 42 is adjusted to effect throttling of the air supply to such servo-motor by means of an expansible bellows 43 connected with the air supply line 44 in parallel with a conduit 44a terminating in a nozzle (not shown) mounted upon a block 45 which can be adjusted longitudinally from the exterior of the casing by means of an adjusting device 46. The pointer 41 is arranged to follow the movement of the block 45 and thereby indicates the setting of the nozzle. The nozzle is controlled by a flapper 46a pivoted upon the block and adapted to be engaged by a finger 46b rigidly connected with the arm 40 and with the registering or recording arm 20. Upon movement of the arm 20 into registry or approximate registry with the setting pointer 41, the finger 46b tilts the flapper to such an extent as to cause discharge of air from the bellows 43 to the proper degree to cause adjustment of the diaphragm valve to the position in which the desired rate of flow, as predetermined by the setting of the pointer 41, is established in the controlled conduit. It will be clear that fluctuations in the rate of flow through the controlled conduit will be accompanied by changes in the level of the mercury in both of the columns 11 and 13 and will be followed by suitable adjustment of the flapper 46a in a direction to restore the predetermined rate of flow. A high resistance coil 44b connecting air conduits 44a and 42a retards full expansion or contraction of bellows 43, as described in the above-mentioned application of Frank J. Bast.

The operation of the above-described mechanism will be clear from the foregoing description and may be briefly stated as follows: Upon rise of the float 19 in the column 11, the chain 21 will be unwound from the pulley 22 and will cause rotation of the latter in a clockwise direction as viewed from the right in Fig. 2. The rotor or core 26 will be correspondingly moved, and in seeking the position of greatest magnetic permeability, the pole pieces and magnets 33, 34 will rotate to an equal degree in the same direction until the core 26, which is more or less oblong in cross-section and of about the same width as the pole pieces (see Fig. 4), is in line with such pole pieces. This movement is thus transmitted to the shaft 31, the parts 26, 33, 34 in effect constituting a magnetic clutch. From the shaft 31 the motion is transmitted by pinion 36 which meshes with the segment 37.

The core 26 is, of course, so constructed that upon movement thereof relatively to the magnet, the magnetic permeability of the path between the poles 33, 33 is reduced, so that the magnet is compelled to follow the movements of the core, as is well understood in the art.

Upon fall of the float 19, the slack which is thereby created in the chain 21 is taken up by rotation of the pulley 22 in a counterclockwise direction by the spring 27, the chain 21 being then wound on the pulley. The cord 26 will be simultaneously moved in the same direction and the shaft 31 will move to an equal degree.

It will be noted that equal vertical movements of the float 19 will produce equal angular displacements of the shaft 23 and hence of the shaft 31. By making the arms 38 and 40 of equal length and parallel with each other, the angular movements of arm 20 will be directly proportional to the vertical displacements of the float 19.

The column 13 may be cylindrical in shape or of any other desired configuration, but I prefer so to shape the interior outline thereof, as shown on the drawings, that the volume of mercury displaced is proportional to the square root of the differential pressure, thereby simplifying the measurement of a flowing fluid since the volume of such fluid is directly proportional to the square root of the pressure differential created by causing the fluid to flow through a restricted orifice or the like.

The high pressure column of the U-tube 11, 12', 13 is provided with safety means for protecting the instrument in the event of an excessive rise or fall in the level of the liquid in such column resulting from an excess or deficiency of pressure in either of the columns 11, 13. This safety mechanism comprises a rod 47 which passes through a guiding member 48 screw-threaded into the cap 49 of the sealed column 13. A weight 50 acting as a control float is guided in its vertical movement upon the guiding member 48, and through the medium of the screws 48a is limited as to its downward movement by a flange 51 on such member. The float is adapted to be engaged by a collar 52 fixed upon the rod 47, so that the float is carried upwardly as said rod is lifted, but permits further downward movement of the rod when such movement of the float is restrained by the flange 51.

A float 53 is carried by the rod 47 and is normally constantly submerged in the column of mercury. The rod is provided at its lower end with spaced valve heads 54 and 55 adapted to cooperate with a double seat 56 held in place within the arm 13 by a bushing 57.

The rod 47 is normally held by the weight 50 against rising to the extent at which the lower valve head 55 engages its seat, the float acting as a stop for the collar 52. The communication between the low pressure and high pressure arms or columns 11 and 13 will accordingly remain open so long as the level of the mercury in column 13 is not so low as to expose the float 53, causing the latter to fall and valve 54 to close, nor so high as to lift the weight 50 to the point where the rod 47, following such float, causes the valve 55 to close. Thus at a minimum and a maximum level of the mercury in column 13, predetermined by the range of the instrument, the valve 54 or 55 will close, thereby interrupting communication between the two vertical columns of the U-tube and preventing all of the mercury of one column from being forced into the other column and into the pipe system 14, 16. Assuming that the valve 55 has closed as a result of a relative excess of pressure in column 11, then as soon as the pressure on such low pressure side falls, the check valve 55 will open slightly to permit the excess mercury to flow back to the low pressure column. The level of the mercury in column 13 will thereupon fall, and so will weight 50, thereby causing valve 55 to open to a greater extent.

Similarly, after valve 54 has closed due to an abnormal excess of pressure in the column 13, fall of such pressure will cause opening of the valve and return of the expelled mercury to the proper extent.

It will be noted that the valves 54 and 55 and the seat 56 are always immersed in the body of mercury, and when made of suitable material will remain always clean and insure proper operation of the safety mechanism.

The bottom of the arm 13 is provided with a centrally bored plug 58 within which is positioned a damping device in the form of a screw 59 which is threaded into the plug and is provided with a tapered tip adapted to cooperate with a port 60 in the bushing 57 to control the flow area between the two arms or columns of the U-tube. By adjustment of the screw 59, the rate of flow of mercury into or from the column 13 can be throttled to the extent necessary to insure proper operation of the safety mechanism 47—56. The screw passes through a stuffing box 61 and is provided with a slot at its outer end for engagement by a screw driver. The outer end of the screw is positioned within a hollow sleeve 62 adapted to be closed by a cap 63 which is in threaded engagement with the outer end of the sleeve, there being interposed a suitable packing 64 between the cap and sleeve for insuring against the loss of any mercury that may have worked its way through the stuffing box 61. A similar packing is provided also between the column 13 and the plug 58. It will be noted that the arrangement is such that the screw can be adjusted without interrupting the operation of the instrument. The cap 63 prevents access to the adjustable screw 59 after the latter has once been set, and if desired, it may be constructed or be provided with means to prevent removal thereof and tampering with the screw 59 by unauthorized persons.

The low pressure column 11 is closed by a plate 65 which may be provided with a filling opening 66 sealed by a plug 67. The plate 65 may be clamped to a horizontal flange 68 extending from the upper part of the column 11 by bolts 69.

The U-structure 11, 12', 13 is supported upon a hollow post 70 which in turn is fixed, as by a screw or other suitable means, to a wall bracket 71 having a tubular standard or to a pipe stanchion (not shown) fitting within said post, the bracket 71, as shown, being attached to the wall within which the casing 10 is mounted.

While I have illustrated my invention as embodied in a flow meter and controller in order to explain the principles thereof, it should be understood that the specific constructions and combination of parts disclosed hereinabove have been presented only by way of example; and that various modifications in the form and arrangement of parts to adapt them to different situations and for different instruments and devices may be resorted to within the scope of the appended claims without departing from the spirit of the invention.

I claim:

1. A U-gauge of the float type comprising a substantially U-shaped structure having two vertical columns laterally displaced from each other with an intervening space therebetween and containing a body of measuring liquid, a relatively narrow connection between the bottoms of said columns and bridging the space therebetween, a float arranged in one of said columns and adapted to follow the changes in the level of the liquid in said column, mechanism disposed externally of said structure and adapted to be adjusted in accordance with fluctuations in the level of the measuring liquid, and means located wholly within the column containing said float and considerably above said connection for transmitting the movement of the float to said mechanism, said means comprising a rotatable magnetic core member journalled within the body of liquid in the column containing said float and connected with said float to be rotated in one or the other direction in response to the vertical movements of the float, a rotatably mounted magnet arranged externally of said piping and adapted to follow magnetically the movements of said core member, and mechanism connecting the magnet and said first-mentioned mechanism.

2. A U-gauge of the float type comprising a substantially U-shaped structure having vertical columns containing a body of measuring liquid; a float arranged in one of the columns of said structure and adapted to follow the changes in the level of the liquid in said column; mechanism disposed externally of said U-structure and adapted to be adjusted in accordance with fluctuations in the level of the measuring liquid; means for transmitting the movement of said float to said mechanism, comprising a magnetic member connected with said float to be shifted in one or the other direction in response to the vertical movements of the float, a rotatably mounted magnet arranged externally of said structure and adapted to follow magnetically the movements of said member, and mechanism connecting the magnet and the first mentioned mechanism; and a magnetic shield surrounding the magnet and connected with the magnet to move therewith to protect the same against external influences.

3. A U-gauge of the float type comprising a substantially U-shaped piping having laterally spaced vertical columns containing a body of measuring liquid and a narrow gauge pipe connecting the bottoms of said columns, a float arranged in one of the columns of said U-piping, said column having a constriction in the wall thereof directly below said float and above said connecting pipe providing a pair of valve seats in said column, said seats being normally submerged in the liquid in said column, a double check valve connected to said float and adapted to engage one or the other seat to close the communication between the two columns of the U-piping when moved in one or the other direction in response to an abnormal difference in pressure between said columns, and means for overcoming the buoyancy effect of the float to hold the valve in the normally open condition.

4. A U-gauge of the float type comprising a substantially U-shaped piping having laterally spaced vertical columns containing a body of measuring liquid and a narrow gauge pipe connecting the bottoms of said columns, a float arranged in one of the columns of said U-piping, means providing a pair of valve seats in said column below said float, a rod depending from said float and extending through said seats, a pair of spaced valve heads arranged on said rod below the float, one valve head being disposed above and the other below the valve seats, in such manner that upon excessive movement of the float in either direction one or the other of said valve heads engages the associated seat to close the communication between the said columns, and means for overcoming the buoyancy effect of the float to hold the valve heads in the normally open condition.

5. In an instrument of the class described, the combination of a vertical column containing a body of measuring liquid therein, a second column spaced laterally from the first, a pipe connecting the bottoms of said columns, a float in one of said columns on the surface of said liquid, a substantially cylindrical chamber located below the normal level of the liquid in said column and above said connecting pipe, having non-magnetic walls and communicating with said column, mechanism disposed externally of the chamber and adapted to be adjusted in correspondence with the movement of said float, and magnetic mechanism for transmitting the movement of said float to said external mechanism through the medium solely of magnetic lines of force passing through the wall of said chamber, comprising a non-circular magnetic core journalled in said chamber, a connection between said float and said core, and a rotatable magnet journalled externally of the chamber and having pole pieces arranged about the chamber and in radial alignment with said core, said core being constructed to change the magnetic permeability of the path between the poles of the magnet upon movement relatively to the magnet.

6. An instrument as set forth in claim 5, including a casing surrounding the outer portion of the chamber and housing said magnet, and a shaft journalled in the end of the chamber and in the wall of said casing and supporting said magnet.

7. In a flow controller of the type comprising a valve for controlling the flow in a pipe having a constricted orifice which operates to establish regions of high and low pressure and a relay for effecting operation of the valve, the combination of a U-tube containing a body of measuring liquid, the columns of said U-tube having inlets adapted to be connected with said pipe, at both sides of said constricted orifice, one column of the U-tube being connected with the high pressure side and the other column with the low pressure side, a float on the surface of the liquid in one of said columns, a substantially cylindrical chamber located below the normal level of the liquid in said column, magnetic mechanism for transmitting the movement of said float to said relay through the medium of magnetic lines of force passing through the wall of said chamber, comprising a magnetic core journalled in said chamber, a connection between said float and said core, a rotatable magnet journalled externally of the chamber and having pole pieces arranged in radial alignment with said core, said core being constructed to change the magnetic permeability of the path between the poles of the magnet upon movement relatively to the magnet, and an actuating member for the relay arranged for operation upon movement of said magnet.

8. In a flow control apparatus for controlling the flow through a pipe having a constricted orifice, the combination with a U-tube containing a body of liquid therein, the vertical columns of such tube having inlets adapted to be connected upon opposite sides of said constricted orifice in said pipe, the liquid in the U-tube being thus sensitive to the difference of pressure at the points of connection and hence to the rate of flow through the pipe; a float on the surface of the liquid in one of said columns, a substantially cylindrical chamber located below the normal level in said column; flow control mechanism associated with said column and including a pneumatically operated valve in said pipe, and a pilot valve controlling the pressure on the aforementioned valve; means disposed externally of said column and arranged to effect adjustment of said pilot valve in accordance with the movement of said float to regulate the flow through said pipe, said means including a shaft and a magnet assembly on said shaft externally of the column; a second shaft journalled in said chamber; a magnetically permeable core on said second shaft, the chamber wall between said core and magnet assembly being non-magnetic; and a connection between said float and second-mentioned shaft whereby the latter is rotated in the one or the other direction as the float moves up or down according to variations in the level of the liquid, movement of the float in response to changes in the rate of flow through the pipe thereby effecting adjustment of the pilot valve and of the pneumatically operated control valve to maintain the flow through the pipe at a predetermined value.

9. In a flow control apparatus for controlling the flow through a pipe having a constricted orifice, the combination with the vertical columns of a U-gauge containing a body of liquid therein and having inlets adapted to be connected upon opposite sides of a constricted orifice in said pipe, the liquid in said U-gauge being thus sensitive to changes in the rate of flow through the pipe; a freely moving float on the surface of the liquid in one of said columns, the height of such float being thus determined by the height of the liquid in such column, a substantially cylindrical chamber located below the normal level in said column; pneumatically operated flow control mechanism associated with said float-containing column and including a control valve in said pipe, and an adjustable pilot valve acting to regulate the pressure on said valve; means disposed externally of said column and operating to effect adjustment of said pilot valve in accordance with the movement of said float to effect a compensating adjustment of the control valve and comprising a shaft, a magnet assembly on said shaft, means associated with the shaft for actuating the pilot valve; a second shaft journalled in said chamber, a magnetically permeable core on said second shaft, the chamber wall between said core and magnet assembly being non-magnetic; and a connection between said float and second mentioned shaft whereby the latter is rotated in one or the other direction as the float moves up or down according to variations in the level of the liquid, said second shaft being journalled below the normal level of the liquid and being thereby protected together with the mechanism mounted thereon against foreign matter and corrosion.

10. A U-gauge of the float type comprising a substantially U-shaped piping having laterally spaced vertical columns containing a body of measuring liquid and a narrow gauge pipe connecting the bottoms of said columns, a float arranged in one of the columns of said U-piping, said column having a constriction in the wall thereof directly below said float and above said connecting pipe providing a pair of valve seats in said column, said seats being normally submerged in the liquid in said column, a double check valve connected to said float and adapted to engage one or the other seat to close the communication between the two columns of the U-piping when moved in one or the other direction in response to an abnormal difference in pressure between said columns, said float being normally submerged and exerting a buoyant effect on said valve, and a weight arranged normally at the surface of the liquid and adapted to balance the buoyant effect of the float to hold the valve in the open condition but adapted to be lifted by the liquid to a degree permitting closing of the valve when an excessive rise in the level of the liquid occurs.

11. In an instrument of the class described, the combination of a vertical column containing a body of measuring liquid therein, a float on the surface of said liquid, means disposed externally of said column and adapted to effect a movement in correspondence with the movement of said float, a cylindrical chamber having non-magnetic walls extending laterally of said column and communicating with the liquid-containing portion of the latter, a magnetic core journalled in said chamber, means connecting the core and float to cause rotary movement of the core in correspondence with the displacements of the float, a rotatable magnet journalled externally of the chamber and substantially surrounding the chamber, said magnet having pole pieces in radial alignment with said core and thus straddling said chamber, and means connecting said magnet with said first-mentioned means, said core being constructed to change the magnetic permeability of the path between the poles of the magnet upon movement relatively to the magnet, and said chamber communicating with said column below the normal level range of the liquid in said column, whereby said core and its supporting bearings are normally immersed in said liquid.

12. A U-gauge of the float type comprising a substantially U-shaped piping having vertical columns containing a body of measuring liquid, a float arranged in one of the columns of said U-piping, means providing a pair of valve seats in said column directly below said float, said seats being normally submerged in the liquid in said column, a double check valve connected to said float and adapted to engage one or the other seat to close the communication between the two columns of the U-piping when moved in one or the other direction in response to an abnormal difference in pressure between said columns, said float being normally submerged and exerting a buoyant effect on said valve, a weight arranged normally at the surface of the liquid and adapted to balance the buoyant effect of the float to hold the valve in the open condition but adapted to be lifted by the liquid to a degree permitting closing of the valve when an excessive rise in the level of the liquid occurs, and a stop for limiting the downward movement of said weight.

13. In a U-gauge of the float type comprising a substantially U-shaped structure having vertical columns containing a body of measuring liquid, the combination comprising means providing a valve seat in one of the columns, said seat being normally submerged in the liquid in such column, a normally submerged float, a valve attached to said float and adapted to engage said seat when the liquid in said column reaches an abnormal level, said float tending normally to rise in said liquid, a rod projecting upwardly from said float and extending above the level of the liquid in the column, a weight resting upon said rod and tending to overcome the buoyant effect of the float, said weight being structurally separate from said rod, and a stop limiting the downward movement of said weight upon fall in the level of the liquid, whereby upon further, excessive fall of the level of the liquid below a level corresponding to the height of such stop, said float is free to move downwardly under its own weight and that of the valve and rod and close the valve to prevent excessive evacuation of said column.

14. In an instrument of the class described, the combination of a U-gauge of the float type comprising a substantially U-shaped piping including laterally spaced vertical columns containing a body of measuring liquid and tubing connecting said columns at approximately the bottom ends and bridging the space intervening between said columns, a float in one of said columns adapted to follow the fluctuations in the level of the liquid in such column, indicating mechanism disposed externally of said piping and a casing therefor whose plane is substantially parallel to the plane defined by the vertical axes of said columns, a substantially cylindrical chamber having walls of non-magnetic material projecting laterally from the column containing said float and positioned between said column and said casing, said chamber communicating with said column below the normal level of the liquid in such column, so that said chamber is normally filled with said liquid, a magnetic member journalled in said chamber, means connecting said member and said float and operating to cause rotation of said member in accordance with the vertical movements of the float, a magnet arranged externally of said chamber and having pole pieces in radial alignment with said magnetic member, a shield surrounding and connected to said magnet to move therewith, and a connection between said external magnet and said indicating mechanism.

PAUL F. K. ERBGUTH.